July 28, 1931.  E. W. VON WALDENBURG-STRAUS-SCHARINA  1,816,064
FILTERING APPARATUS
Filed June 12, 1930
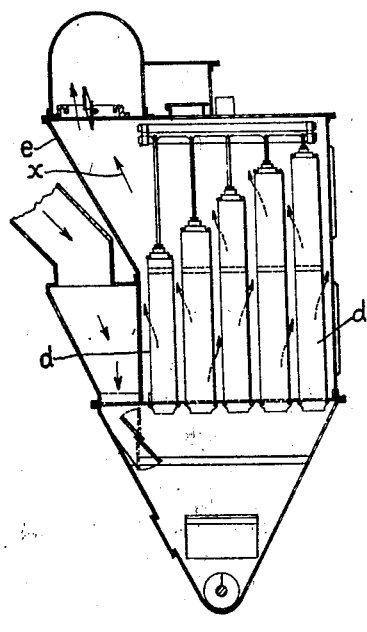 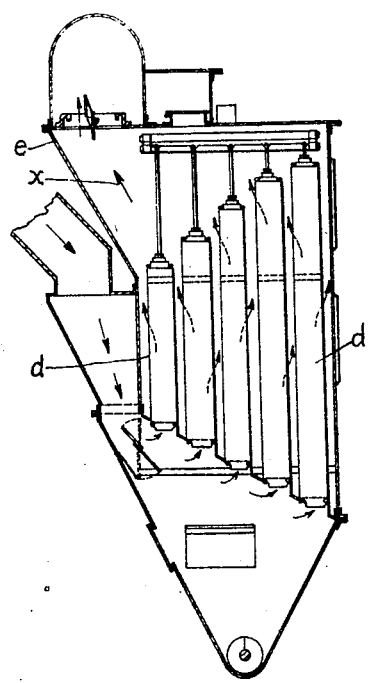
Inventor
Eduard Wilhelm v. Waldenburg-
  Straus-Scharina
by
Attorney.

Patented July 28, 1931

1,816,064

UNITED STATES PATENT OFFICE

EDUARD WILHELM von WALDENBURG-STRAUS-SCHARINA, OF LUBECK, GERMANY

FILTERING APPARATUS

Application filed June 12, 1930, Serial No. 460,701, and in Germany June 12, 1929.

My invention relates to improvements in filtering apparatus and more particularly in filtering apparatus of the type in which tubular filtering elements are disposed in chambers of a casing in several series, and either one behind the other or offset with relation to one another. The object of the improvements is to provide a filtering apparatus of this type which has a high efficiency, and with this object in view my invention consists in disposing the filtering elements of the chambers of the casing so that the upper ends of the filtering elements are in stepped relation, the said upper ends being disposed successively at higher levels beginning from the air intake towards the rear wall of the casing remote therefrom. For the purpose of explaining the invention two examples embodying the same have been shown in the accompanying drawings in which the same reference characters have been used in all the views to indicate corresponding parts. In said drawings, Fig. 1 is a diagrammatical sectional elevation showing the filtering apparatus, and Fig. 2 is a similar sectional elevation showing a modification.

In the construction shown in Fig. 1 the upper ends of the tubular filtering elements $d$ are in stepped relation, the upper ends being successively disposed at a higher level from the delivery passage $e$ towards the rear wall of the casing. The filtered air is delivered through the pipe $e$ in the direction of the arrow $x$. Therefore the filtered air leaving a filtering element can flow towards the delivery passage $e$ without being obstructed by conflicting air currents from different filtering elements or by engagement with the walls of the adjacent filtering elements in some of the arrangements heretofore in use. Thus the efficiency of the filtering elements is increased. Furthermore by making the filtering elements different in length, the air for cleaning the filters, which air flows in the opposite direction, is admitted in a more efficient way.

In Fig. 2 I have shown a modification in which the loss of filtering surface by the reduction of the length of the filtering elements at their upper ends is compensated, and in which the air to be cleaned is admitted in a better way, and for this purpose the lower ends of the tubular filtering elements $d$ are likewise in stepped relation, the said lower ends being successively disposed at rising levels from the rear wall of the casing towards the intake passage for the air to be filtered. The partition having the bottoms of the filtering elements fixed thereto is inclined rearwardly and downwardly. This construction permits the partition to be readily cleaned, and it allows water of condensation to flow away from the casing.

I claim:

1. A filtering apparatus, comprising a casing having an intake passage and a delivery passage, and a plurality of tubular filtering elements having their upper ends progressively higher as their distance from the delivery passage increases.

2. A filtering apparatus, comprising a casing having an intake passage and a delivery passage, and a plurality of tubular filtering elements having their upper and lower ends respectively in stepped relation, the upper ends being successively higher from the delivery pipe rearwardly and the lower ends being successively lower from the intake passage towards the rear wall of the casing.

In testimony whereof I affix my signature.

EDUARD WILHELM von WALDENBURG-
STRAUS-SCHARINA.